United States Patent
Delgado et al.

(10) Patent No.: US 6,797,923 B2
(45) Date of Patent: Sep. 28, 2004

(54) WELDING CABLE INSULATION METHOD AND APPARATUS

(75) Inventors: David Delgado, Cucamonga, CA (US); Eric Frei, Santa Clarita, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/141,088

(22) Filed: May 8, 2002

(65) Prior Publication Data

US 2003/0209524 A1 Nov. 13, 2003

(51) Int. Cl.[7] ................................................. B23K 9/32
(52) U.S. Cl. ........................... 219/137.63; 219/137.9
(58) Field of Search ...................... 219/137.63, 137.31, 219/137.44, 137.51, 137.52, 137.9; 174/73.1, 140 R

(56) References Cited

U.S. PATENT DOCUMENTS

| | | | | |
|---|---|---|---|---|
| 3,629,547 A | * | 12/1971 | Kester et al. ............... | 219/120 |
| 4,133,970 A | * | 1/1979 | Lusk ........................... | 174/19 |
| 5,965,045 A | * | 10/1999 | Zigliotto ................. | 219/137.31 |
| 6,066,835 A | * | 5/2000 | Hanks ...................... | 219/137.9 |
| 6,078,023 A | * | 6/2000 | Jones et al. ............ | 219/137.63 |
| 6,271,497 B1 | * | 8/2001 | Zapletal ................. | 219/121.36 |

* cited by examiner

Primary Examiner—Kiley Stoner
Assistant Examiner—Kevin P. Kerns
(74) Attorney, Agent, or Firm—Fletcher Yoder

(57) ABSTRACT

A housing for a cable adapter assembly is featured. The housing may comprise a plurality of pieces that may be secured together, each piece forming a portion of the housing. The housing also may comprise a single piece having portions that are secured to each other around the welding cable adapter to form the housing. The single piece housing may be hinged. The housing may house a welding cable connector and the welding cable adapter. A method of converting a welding cable connector from one type of connector to another also is featured.

30 Claims, 3 Drawing Sheets

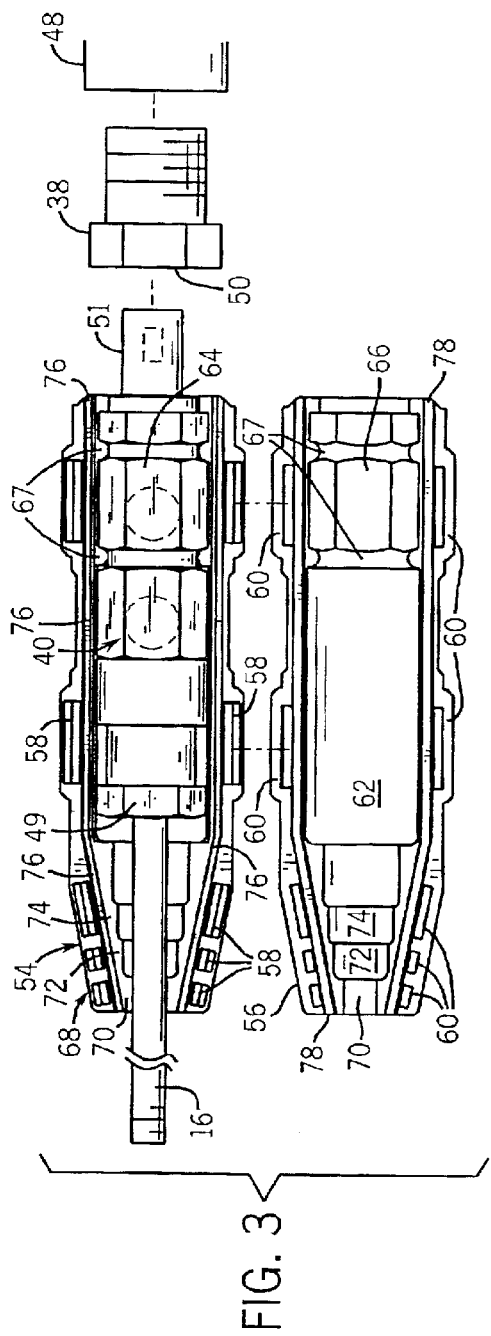
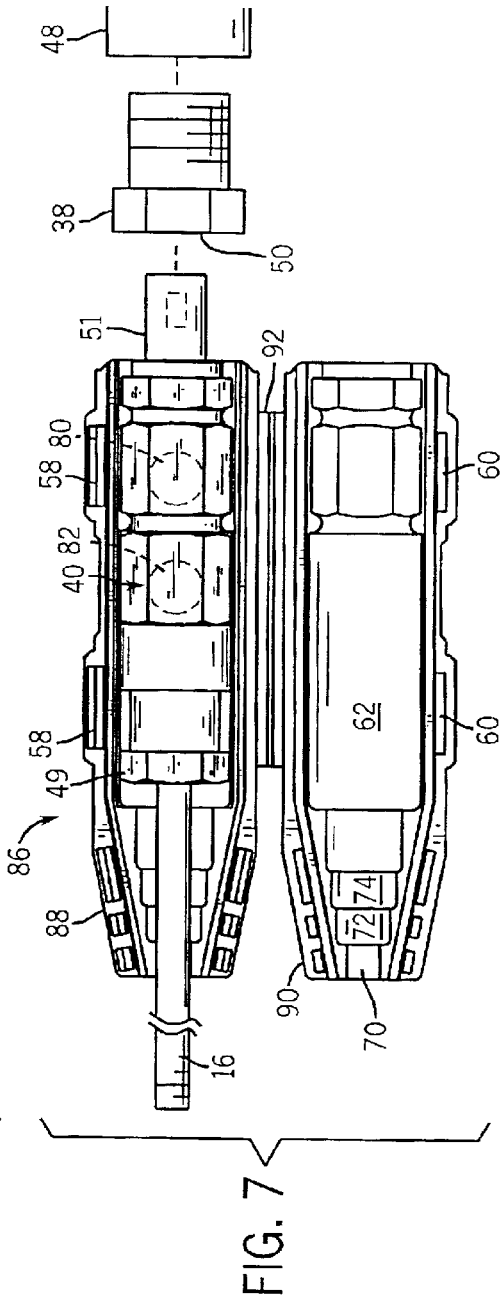

WELDING CABLE INSULATION METHOD AND APPARATUS

BACKGROUND OF THE INVENTION

The present invention relates generally to the field of arc welding systems, and more particularly to an assembly for quickly connecting and disconnecting a welding cable and a power source.

There are many types of arc welding processes and systems. The TIG (Tungsten Inert Gas) welding process (also known as gas tungsten arc welding, GTAW, or HELLARC) is one type of arc welding process. In TIG welding, heat is generated by an electric arc maintained between a non-consumable tungsten electrode and a workpiece. The electrode is secured to a welding torch. The welding torch is small enough in most cases so that the operator can hold it like a pencil. Welding wire may be fed into the weld puddle formed by the arc when filler material is desired. An inert gas may be used to isolate the weld puddle and the area surrounding the weld puddle from the atmosphere, preventing rapid oxidation of the weld and the surrounding metal.

The electricity for the welding process is provided by a power source. Typically, the power source is constant current AC, DC, or a combination AC/DC source. Electrical power is coupled to the welding torch by a welding cable. In addition, inert gas typically flows through the welding cable to the welding torch. A gas cylinder, or other source of gas, is coupled to the power source to supply the gas to the welding cable. The TIG welding process typically generates a substantial amount of heat. Consequently, a cooling fluid may be used to cool the welding torch. A cooling unit coupled to the welding cable may provide the cooling fluid. A typical welding cable for a TIG welding system may transport electricity, gas, and cooling fluid.

A welding cable is usually connected to a power source by threaded connectors. For example, the power source may have a female threaded connector and the welding cable may have a corresponding male threaded connector. Electricity and gas flow from the power source to the welding cable through the threaded connectors. Many users of TIG welding systems prefer connectors other than threaded connectors, such as quick-disconnect connectors. Consequently, connector assemblies that enable a user to convert threaded connectors to quick-disconnect connectors have been developed.

A typical quick-disconnect assembly comprises a first adapter for connection to the power source and a second adapter for connection to the welding cable. The first and second adapters are designed to enable the first and second connectors to be quickly connected and disconnected. A protective insulating boot is provided to cover the second adapter and adjacent portions of the welding cable. Because of the bell shape of the boot, which conforms to the bell shape of the adapter set, the boot must be slipped over the welding cable at the end coupled to the welding torch, opposite the second adapter, and slid up the welding cable to the second adapter. However, this process is time consuming and requires removal and replacement of the welding torch to the cable.

Therefore, a need exists for a quicker and easier technique for converting a welding cable from one type of connector to a second type of connector. Specifically, there is a need for a technique for installing a protective housing to the welding cable adapter in a manner other than by disconnecting the welding cable from the welding torch and sliding the housing up the welding cable toward the adapter.

SUMMARY OF THE INVENTION

The present technique provides a housing for a welding cable adapter assembly designed to respond to these needs. The housing may comprise a plurality of pieces that may be secured together, each piece forming a portion of the housing. The housing also may comprise a single piece having housing portions that are secured to each other around the welding cable adapter to form the housing. A hinge may connect the single piece housing portions. The housing may house a welding cable connector and a welding cable adapter. The housing may be comprised of a material that is an electrical insulator.

The present technique also provides a method of converting a welding cable connector from one type of connector to another. The method may comprise connecting a welding cable to an adapter and securing a housing around the adapter to cover at least a portion of the adapter and the welding cable connector.

The present technique also provides a method of manufacturing a housing for a welding cable adapter. The method may comprise molding one or more boot pieces from a polymeric material. The method may comprise molding the one or more boot pieces with connectors adapted to connect together to form the boot pieces into a housing for the welding cable adapter.

BRIEF DESCRIPTION OF THE DRAWINGS

The foregoing and other advantages and features of the invention will become apparent upon reading the following detailed description and upon reference to the drawings in which:

FIG. 3 is an exploded view illustrating the assembly of a two-piece boot to the welding cable adapter assembly, according to an exemplary embodiment of the present invention;

FIG. 7 is an exploded view illustrating the assembly of a one-piece hinged boot around a welding cable adapter to form a housing for the welding cable adapter, according to an exemplary embodiment of the present invention.

DETAILED DESCRIPTION OF SPECIFIC EMBODIMENTS

Figure 1:
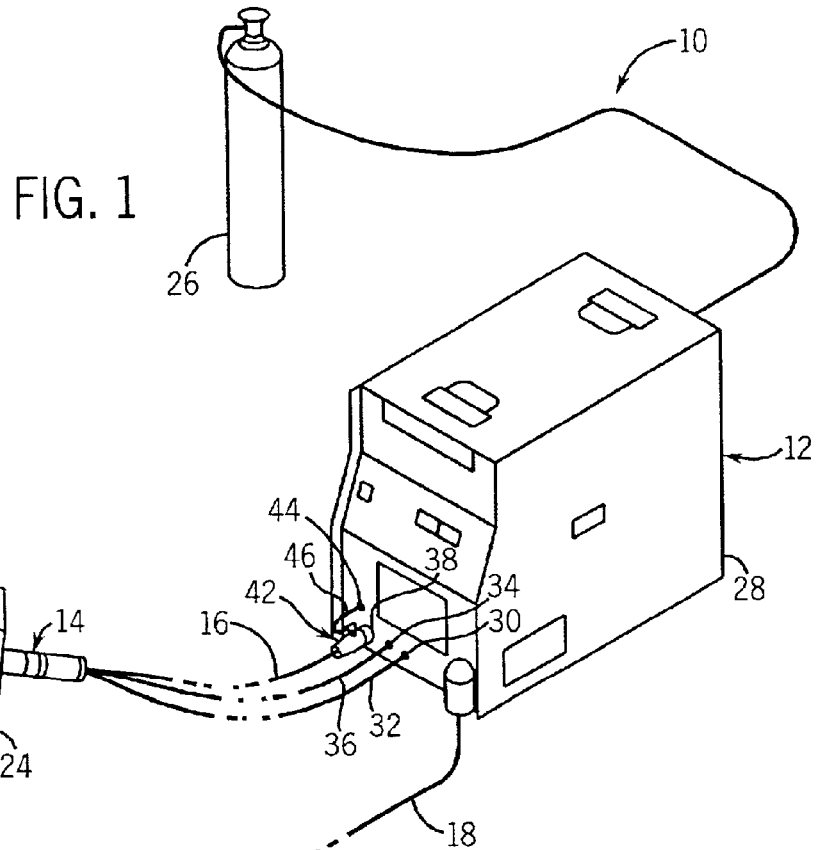
FIG. 1 is a perspective view of a water-cooled TIG welding system, according to an exemplary embodiment of the present invention.

Referring generally to FIG. 1, a water-cooled TIG welding system is illustrated, as represented generally by reference numeral 10. However, the present technique is applicable to other types of welding systems as well. The TIG welding system 10 comprises a power supply 12, a TIG welding torch 14, a welding cable 16, and a return cable 18. The power supply 12 may be a constant current AC, DC, a combination AC/DC source, or some other type of power supply. The welding cable 16 electrically couples the welding torch 14 to one terminal of the power supply 12. The return cable 18 is electrically coupled to a second terminal of the power supply 12. In the illustrated embodiment, the return cable 18 has a clamp 20 that is adapted to secure and electrically couple the return cable 18 to a workpiece 22 to be welded. In addition, the welding torch 14 is adapted to receive an electrode 24. During operation, when the electrode 24 touches the conductive material 22 to be welded, an electric circuit is completed from one terminal of the power supply 12, through the welding cable 16, the electrode 24, the work clamp 20, and the return cable 18 back to a second terminal power supply 12.

In the illustrated embodiment, gas from a gas cylinder 26 is provided to the welding torch 14 via the power supply 12. In addition, cooling water from a cooling unit 28 is provided to the welding torch 14 via the power supply 12. The gas is coupled to the torch 14 through a gas supply connector 30 on the power supply 12 and a gas hose 32. The cooling water is coupled to the torch 14 through a water supply connector 34 on the power supply 12 and a water hose 36. Electricity and heated cooling water returning from the torch 14 are coupled to the power supply 12 through the welding cable 16.

Figure 4:
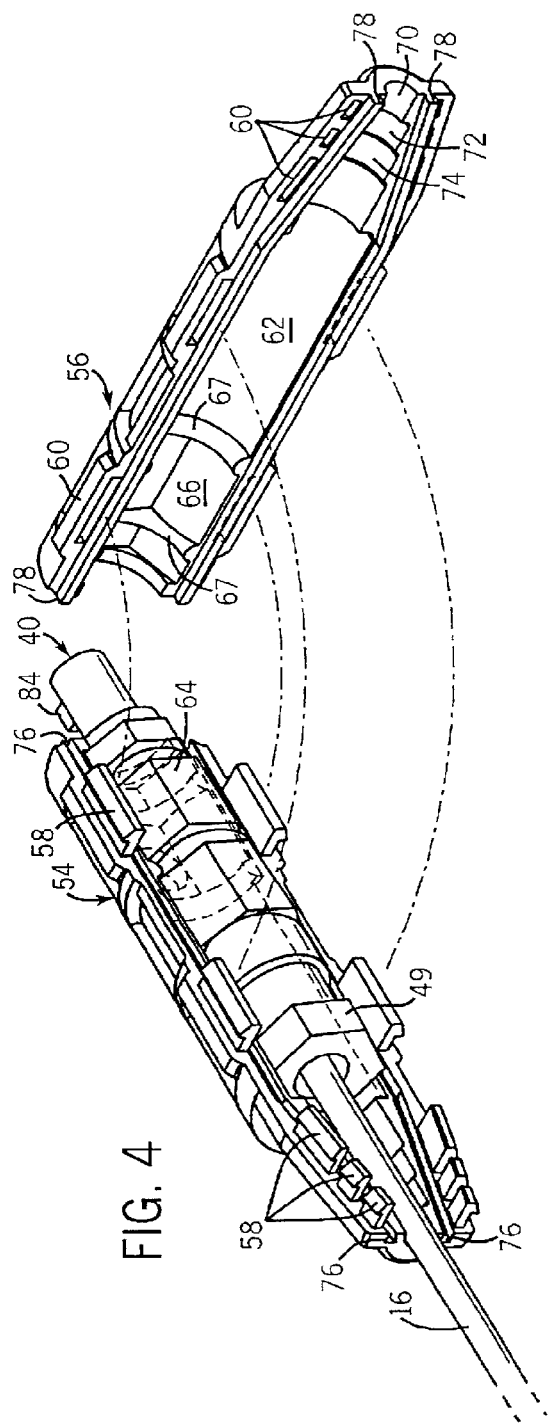
FIG. 4 is a perspective view illustrating the assembly of the two-piece boot to the welding cable adapter assembly, according to an exemplary embodiment of the present invention.

The electricity is provided to the welding cable 16 by a first adapter 38 on the power supply 12 and a second adapter 40 (as best illustrated in FIGS. 3 and 4). The second adapter 40 is part of a connector assembly 42. Preferably, the adapters are twist-connect adapters. Twist-connect adapters generally only require one of the connectors to be turned a quarter of a turn, relative to the other, to connect or disconnect the connectors. In the illustrated embodiment, the returning cooling water is conducted from the connector assembly 42 to a water return connector 44 on the power supply through a water hose 46.

Figure 2:
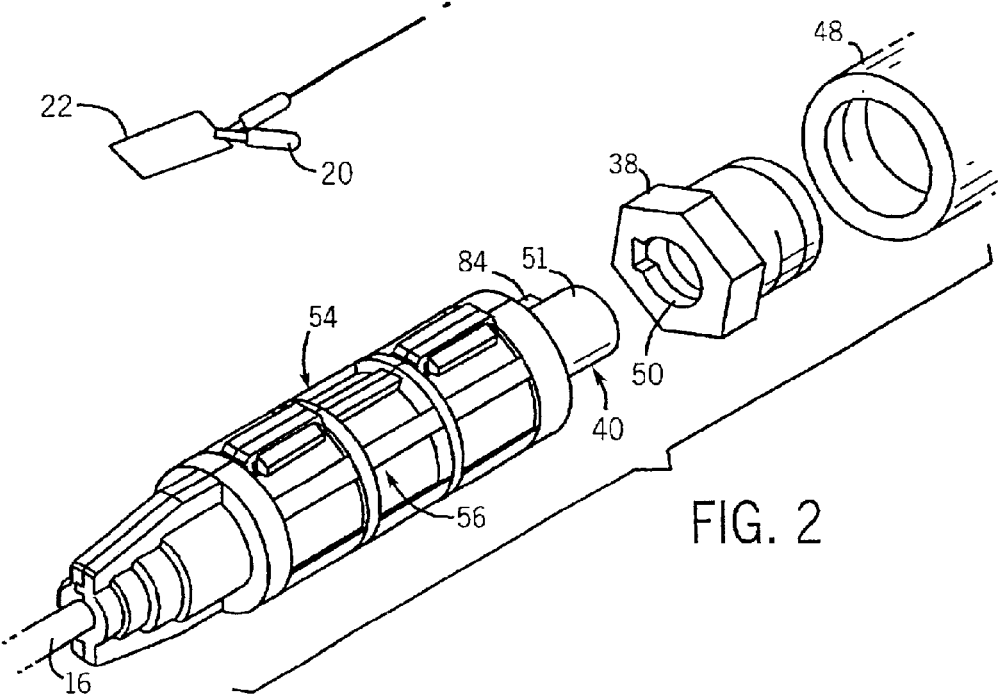
FIG. 2 is a perspective view of a welding cable adapter assembly, according to an exemplary embodiment of the present invention.

Referring generally to FIGS. 2–4, the connector assembly 42 enables a welding cable 16 and power supply 12 that are configured with threaded connectors to be converted to use with another type of connector, such as a twist connector. As best illustrated in FIGS. 3 and 4, the power supply 12 has a threaded power supply connector 48 and the welding cable 16 has a threaded welding cable connector 49. To convert the connectors to other types of connectors, the welding cable connector 49 is unthreaded from the power supply connector 48. The first adapter 38 then is threaded into the power supply connector 48 and the welding cable connector 49 is threaded into the second adapter 40. The connectors on the first and second adapters may then be used to connect and disconnect the welding cable 16 from the power supply 12. In the illustrated embodiment, the first adapter 38 has a female twist connector 50 and the second adapter 40 has a male twist connector 51. However, this arrangement may be reversed. In addition, the adapters may be configured as another type of connector, rather than a twist connector. In this embodiment, to connect the welding cable 16 to the power supply 12, the male connector is inserted into the female connector and rotated clockwise to lock the two connectors together. To disconnect the welding cable 16 from the power supply 12, the male connector 51 is rotated counter-clockwise to unlock the connectors. Then the male connector 51 may be withdrawn from the power supply 12 to separate the welding cable 16 from the power supply 12.

In the illustrated embodiment, the connector assembly 42 has a two-piece boot 52 that is secured around the second adapter 40, the welding cable connector 49, and a portion of the welding cable 16. The boot 52 electrically insulates the connectors and prevents signals produced by the electricity flowing through the connectors from being transmitted to the surrounding environment. In the illustrated embodiment, the boot 52 has a first boot piece 54 and a second boot piece 56. Preferably, the boot 52 is formed of a moldable polymer. In this embodiment, the first boot piece 54 has a plurality of tabs 58 and the second boot piece 56 has a plurality of catches 60. The tabs 58 and catches 60 are adapted to secure the first and second boot pieces together.

Each of the first and second boot pieces has a central cavity 62 for receiving the welding cable connector 49 and the second adapter 40. The second adapter 40 is adapted with a hexagonal nut portion 64. Each of the boot pieces, in turn, has a hexagonal portion 66 adapted to receive the hexagonal nut portion 64 of the second adapter 40. In addition, each boot piece is formed with a rib 67 on each end of the hexagonal portion 66 to prevent axial movement of the hexagonal nut portion 64 relative to the boot 52.

Each of the boot pieces 54 and 56 has a stepped portion 68 that enables the boot 52 to be adapted for use with welding cables of different diameter. In the illustrated embodiment, the stepped portion 68 has three different diameter portions: a first diameter portion 70, a second diameter portion 72, and a third diameter portion 74. The various portions are adapted to receive welding cables of different sizes. The first portion 70 is adapted to receive welding cables of industry standard size 20. The second portion 72 is adapted to receive welding cables of industry standard sizes 17 and 18. The third portion 74 is adapted to receive welding cables of industry standard sizes 12, 26, and 27. Each portion is adapted to form a snug fit around the welding cable for safety and to prevent radio signals from leaking out of the boot 52 around the welding cable 16. The boot is adapted to be cut between the first and second portions when size 17 or 18 welding cable is to be used. The boot is adapted to be cut between the second and third portions when size 12, 26, or 27 welding cable is to be used. Each portion also has a pair of tabs 58 on the first boot piece 54 and a pair of catches 60 on the second boot piece 56 that secure together to help ensure a snug fit around the welding cable when the boot 52 is cut for use with differently sized welding cables.

There are two joints formed on the top and on the bottom of the boot pieces that assist in securing the boot pieces together and in sealing the boot pieces to prevent radio signals from leaking out between the two boot pieces. Referring also to FIG. 4, the first joint is formed along the top of the boot pieces by a female dovetail joint 76 extending along the top of the first boot piece 54 and a male dovetail joint 78 extending along the top of the second boot piece 56, in this view. The second joint is formed along the bottom of the boot pieces by a female dovetail joint 76 extending along the bottom of the first boot piece 54 and a male dovetail joint 78 extending along the bottom of the second boot piece 56, in this view.

Figure 6:
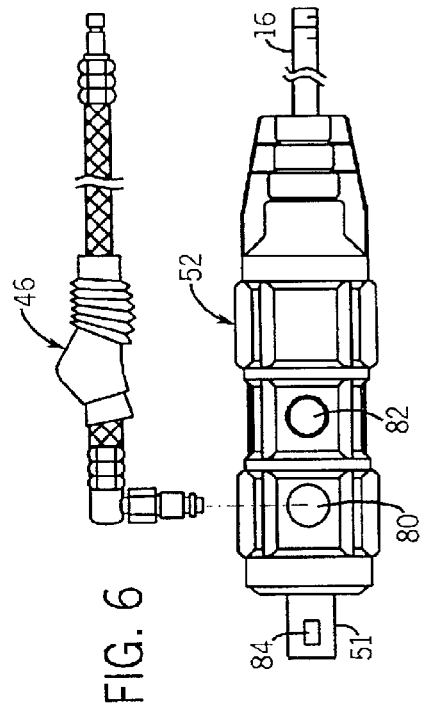
FIG. 6 is an elevational view illustrating the connection of a return water hose to the welding cable adapter assembly, according to an exemplary embodiment of the present invention.
Figure 5:
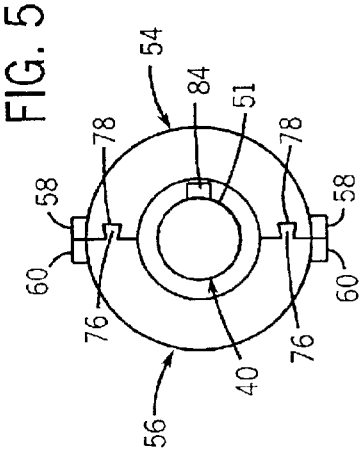
FIG. 5 is an end view of a two-piece boot secured to a welding cable adapter assembly, according to an exemplary embodiment of the present invention.

Referring generally to FIG. 6, in this embodiment, the first boot piece 54 is adapted with a hole 80 so that the water hose 46 can be connected to the second adapter 40 through the boot 52. In addition, the first boot piece 54 is adapted with a punch-out 82. The punch-out 82 can be removed to form a second hole through the first boot piece 54. This view also illustrates a locking tab 84 on the male connector 51. The first adapter captures the locking tab 84 when the male connector 51 is inserted in to the first adapter and rotated.

Referring generally to FIG. 7, an alternative embodiment of a boot 86 is illustrated. In this embodiment, the boot 86 is similar to the previous boot 52, but has a single-piece construction. In the illustrated embodiment, the boot 86 has a first boot section 88 and a second boot section 90 connected by a living hinge 92. To secure the boot 86 around the second adapter 40, the first boot section 88 or the second boot section 90 is positioned against the adapter 40. The other boot section is then pivoted about the hinge 92 to surround the adapter 40. In the illustrated embodiment, the first boot section has a pair of tabs 58 and the second boot section has a pair of catches 60 adapted to capture the tabs 58 and secure the boot sections together around the second adapter 40.

The embodiments described above illustrate various techniques for installing a protective housing to a welding cable adapter in an easier and quicker manner than by sliding the protective housing up the welding cable toward the adapter. Both the two-piece boot and the hinged boot enable a protective housing to be placed directly around the welding cable adapter, a welding cable connector, and a portion of the welding cable without disconnecting the welding cable from a welding torch and sliding the protective housing up the welding cable toward the adapter.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, the protective housing may be used with cables other than welding cables, such as high-voltage power cables and RF signal cables.

What is claimed is:

1. A boot for a welding cable connector assembly, comprising:
    a first boot portion; and
    a second boot portion, wherein the first and second boot portions are connected by a living hinge, and the first boot portion is securable to the second boot portion to form a housing around a welding cable connector and a welding cable connector adapter secured to the welding cable connector.

2. A boot for a welding cable connector assembly, comprising:
    a first boot portion, wherein the first boot portion has a male portion extending along a length of the first boot portion, and
    a second boot portion, wherein the second boot portion has a female portion extending along a length of the second boot portion, and
    wherein the first boot portion is securable to the second boot portion to form a housing around a welding cable connector and a welding cable connector adapter secured to the welding cable connector, the male and female portions forming a seal when the first boot portion is secured to the second boot portion.

3. The boot as recited in claim 2, wherein the first and second boot portions are adapted to prevent relative movement between the welding cable connector adapter and the boot.

4. The boot as recited in claim 2, wherein the first boot portion has a first connector and the second boot portion has a second connector, the first and second connectors being adapted for mating engagement to secure the first and second boot portions to the welding cable connector adapter.

5. The boot as recited in claim 2, wherein the male and female portions are adapted to form a dovetail joint.

6. A boot for a welding cable connector assembly, comprising:
    a first boot portion; and
    a second boot portion,
    wherein the first boot portion is securable to the second boot portion to form a housing around a welding cable connector and a welding cable connector adapter secured to the welding cable connector, wherein the welding cable connector is a threaded connector and the welding cable connector adapter is adapted to couple a threaded connector to a twist-connect connector.

7. A housing for a welding cable adapter assembly, comprising:
    a first cover portion having a first integral connector; and
    a second cover portion having a second integral connector,
    wherein the first integral connector is securable to the second integral connector to secure the first cover portion to the second cover portion around a welding cable adapter.

8. The housing as recited in claim 7, wherein the first and second cover portions are adapted to prevent relative rotational movement between the welding cable adapter and the first and second cover portions.

9. The housing as recited in claim 7, wherein the first and second cover portions are adapted to prevent relative axial movement between the welding cable adapter and the first and second cover portions.

10. The housing as recited in claim 7, wherein the first and second cover portions are separate boot pieces.

11. The housing as recited in claim 7, wherein the first cover portion has a first joint portion extending along a length of the first boot portion and the second boot portion has a second joint portion extending along a length of the second boot portion, the first and second joint portions being adapted for mating engagement.

12. The housing as recited in claim 11, wherein the first and second joint portions form a seal to prevent electrical signals from being transmitted from within the first and second cover portions to a surrounding environment.

13. The housing as recited in claim 7, wherein the first and second cover portions comprise an electrically insulating material.

14. A housing for a welding cable adapter assembly, comprising:
    a first cover portion having a first connector; and
    a second cover portion having a second connector,
    wherein the first and second cover portions are connected by a hinge, and the first connector is securable to the second connector to secure the first and second cover portions to a welding cable adapter.

15. A housing for a welding cable adapter assembly, comprising:
    a first cover portion having a first connector; and
    a second cover portion having a second connector,
    wherein the first connector is securable to the second connector to secure the first and second cover portions to a welding cable adapter, and
    wherein the first and second cover portions have a plurality of connectors disposed along a portion of the first and second cover portions that are adapted to receive welding cables of different diameters, the plurality of connectors on the first cover portion being adapted for mating engagement with the plurality of connectors on the second cover portion.

16. The housing as recited in claim 15, wherein the portions of the first and second cover portions that are adapted to receive welding cables of different diameters are adapted to be cut between each of the plurality of connectors to configure the housing for a welding cable of a specific diameter.

17. A housing for a welding cable adapter assembly, comprising:
   a first cover portion having a first connector; and
   a second cover portion having a second connector,
   wherein the first connector is securable to the second connector to secure the first and second cover portions to a welding cable adapter, wherein the adapter comprises a threaded electrical connector and a twist-connect electrical connector.

18. A conversion kit for converting a welding cable from one type of connector to a second type of connector, comprising:
   a first adapter having a threaded connector and a quick-disconnect connector, the threaded connector being coupleable to a welding cable connector;
   a first boot portion; and
   a second boot portion,
   wherein the first boot portion is securable to the second boot portion to form a housing around the first adapter.

19. The conversion kit as recited in claim 18, comprising a second adapter configured for locking engagement with the quick-disconnect connector, the second adapter being coupleable to a power supply connector.

20. The conversion kit as recited in claim 18, wherein the first boot portion and second boot portion form a housing around the welding cable connector.

21. The conversion kit as recited in claim 18, wherein the first and second boot portions are electrical insulators.

22. The conversion kit as recited in claim 18, wherein the first and second boot portions are separate boot pieces.

23. A conversion kit for converting a welding cable from one type of connector to a second type of connector, comprising:

a first adapter having a first connector and a second connector, the second connector being coupleable to a welding cable connector;
   a first boot portion; and
   a second boot portion,
   wherein the first and second boot portions are connected by a living hinge, and the first boot portion is securable to the second boot portion to form a housing around the first adapter.

24. A housing for a cable connector, comprising:
   a first cover portion having a first connector and a male engagement portion extending along a length of the first cover portion; and
   a second cover portion having a second connector and a female engagement portion extending along a length of the second cover portion, the first and second cover portions being adapted to form a protective housing around a cable connector,
   wherein the first and second connectors are adapted for mating engagement and the male and female engagement portions are adapted for sealing engagement.

25. The housing as recited in claim 24, wherein the first cover portion has one of a first engagement portion and a second engagement portion adapted for mating engagement.

26. The housing as recited in claim 24, wherein the first and second cover portions are connected by a hinge.

27. The housing as recited in claim 24, wherein the first and second cover portions are adapted to form a protective housing around a cable connector adapter.

28. The housing as recited in claim 24, wherein the first and second cover portions comprise a molded polymer.

29. The housing as recited in claim 28, wherein the first and second cover portions are connected by a living hinge.

30. An insulating cover for a welding cable electrical connector, comprising:
   a first insulating member; and
   a second insulating member,
   wherein the first insulating member is formed with a first connector and the second insulating member is formed with a second connector adapted to engage the first connector to secure the first and second insulating members together to form an insulated housing around the welding cable electrical connector.

* * * * *